United States Patent
Buffin

(10) Patent No.: US 6,981,620 B1
(45) Date of Patent: Jan. 3, 2006

(54) EASER ICER

(76) Inventor: Vicki Jo Buffin, 15815 18 Mile Rd., Big Rapids, MI (US) 49307

( * ) Notice: Subject to any disclaimer, the term of this patent is extended or adjusted under 35 U.S.C. 154(b) by 0 days.

(21) Appl. No.: 10/839,152

(22) Filed: May 6, 2004

(51) Int. Cl.
*B67D 5/42* (2006.01)

(52) U.S. Cl. ............... 222/386.5; 222/175; 222/333; 220/212.5

(58) Field of Classification Search .......... 222/386.5, 222/529, 175, 389, 333, 95, 105; 220/212.5
See application file for complete search history.

(56) References Cited

U.S. PATENT DOCUMENTS

| | | | |
|---|---|---|---|
| 3,237,549 A * | 3/1966 | Pospischil | 220/212.5 |
| 4,526,300 A | 7/1985 | Woody | |
| 4,570,833 A * | 2/1986 | Vanderjagt | 222/333 |
| 5,060,826 A * | 10/1991 | Coleman | 222/95 |
| 5,150,820 A * | 9/1992 | McGill | 222/95 |
| 5,361,946 A | 11/1994 | Ginther et al. | |
| 5,797,520 A * | 8/1998 | Donahue | 222/386.5 |
| 6,101,968 A | 8/2000 | Fitzgibbons et al. | |
| 6,494,345 B2 | 12/2002 | Schrader | |
| 6,561,386 B1 * | 5/2003 | Martens | 222/105 |

* cited by examiner

*Primary Examiner*—Philippe Derakshani
(74) *Attorney, Agent, or Firm*—Patent & Trademark Services, Inc.; Joseph H. McGlynn

(57) ABSTRACT

A pastry icing device that has a container into which icing can be placed. The container has an air bag at the bottom, which is operated by a motor, and which compresses the bag to force icing from the container or from an icing bag within the container.

20 Claims, 2 Drawing Sheets

EASER ICER

BACKGROUND OF THE INVENTION

This invention relates, in general, to pastry making accessories and, in particular, to pastry making accessories for placing icing onto a variety of pastries.

DESCRIPTION OF THE PRIOR ART

In the prior art various types of pastry making accessories have been proposed. For example, U.S. Pat. No. 6,101,968 to Fitzgibbons discloses a device for icing cakes, having a container into which icing can be placed and a hose with a nozzle attached to the container. The container has a motor and gear train to force icing out through the hose and nozzle.

U.S. Pat. No. 4,526,300 to Woody discloses a device for icing cakes, having a heated container into which icing can be placed and a hose with a nozzle attached to the container. The container has a motor to force icing out through the hose and nozzle.

U.S. Pat. No. 5,361,946 to Ginther et al discloses a device for icing cakes, which uses a pneumatic air powered cartridge.

U.S. Pat. No. 6,494,345 to Schrader discloses a device for icing cakes which uses a gas powered system operated by a foot pedal.

SUMMARY OF THE INVENTION

The present invention is directed to a pastry-icing device, which has a container into which icing can be placed. The container has an air bag at the bottom, which is operated by a motor, and which compresses the bag to force icing from the container or from a removable icing bag in the container.

It is an object of the present invention to provide a new and improved icing accessory for pastries.

It is an object of the present invention to provide a new and improved icing accessory for pastries, which moves the icing from the container in a more efficient manner.

It is an object of the present invention to provide a new and improved icing accessory for pastries, which moves more of the icing from the container.

These and other objects and advantages of the present invention will be fully apparent from the following description, when taken in connection with the annexed drawings.

DESCRIPTION OF THE PREFERRED EMBODIMENT

Figure 1:
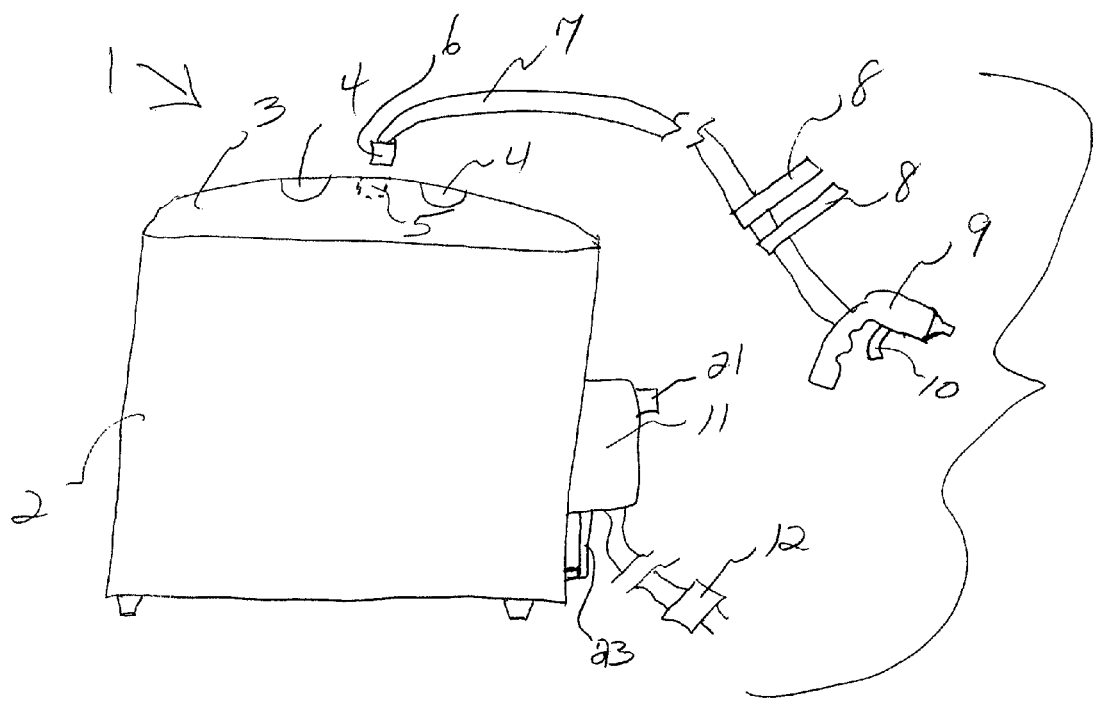
FIG. 1 is a side view of the present invention.

Referring now to the drawings in greater detail, FIG. 1 shows the present invention 1. It comprises a container 2 with a lid 3 (see also FIG. 3) that is secured to and sealed to the top of the container in any conventional manner. The lid has recessed portions 4 which can act as a handle to lift the lid off or put it on the top of the container 2. It should be noted that the shape of the container 2, shown in FIG. 1, is merely for illustrational purposes, and any shape can be used without departing from the scope of the invention. The lid also has an aperture 5, which allows a food grade hose 7 to be attached to an icing bag or to a heavy rubber fitting. Both of these should be screw threaded. The hose 7 could have a fitting 6 that would secure the hose to the aperture 5. The fitting could be any conventional fitting such as a screw-on fitting or a friction fit fitting that could seal the hose through the aperture 5 and into the bag.

The container 2 has a motor 11 removably secured to the container 2 in any conventional manner. The motor is removably secured so it can be removed when the container needs to be washed. The motor has an on/off switch 21 and an electrical connector 12 that can be inserted into a wall outlet to provide electricity to power the motor. An air tube 23 is connected to the motor 11 on one end and is connected on its other end to a tube 20, which is connected to a donut-like airbag 18 inside the container 2 (see FIG. 4) for a purpose to be described below.

Figure 2:
FIG. 2 is a side view of one of the tips that can be used with the present invention.

The air hose 7 cab be of any length and should be made from material that can safely handle food without contamination. The hose has at least one arm strap 8 which will secure the strap to a user's arm in order to keep the hose 7 out of the way when, for example, icing a cake. The hose 7 has an icing gun 9 with an operating trigger 10 attached to an end. The trigger will allow icing to come out of the hose faster the harder the trigger is pulled. The gun 9 is conventional and therefore, no further description is necessary. FIG. 2 shows an icing tip 13 that can be attached to the gun 9. The tip 13 is a conventional wide mouth tip for applying broad amounts of icing at one time. Obviously, other types of tips could be used with the gun 9 to provide different types of icing effects.

Figure 4:
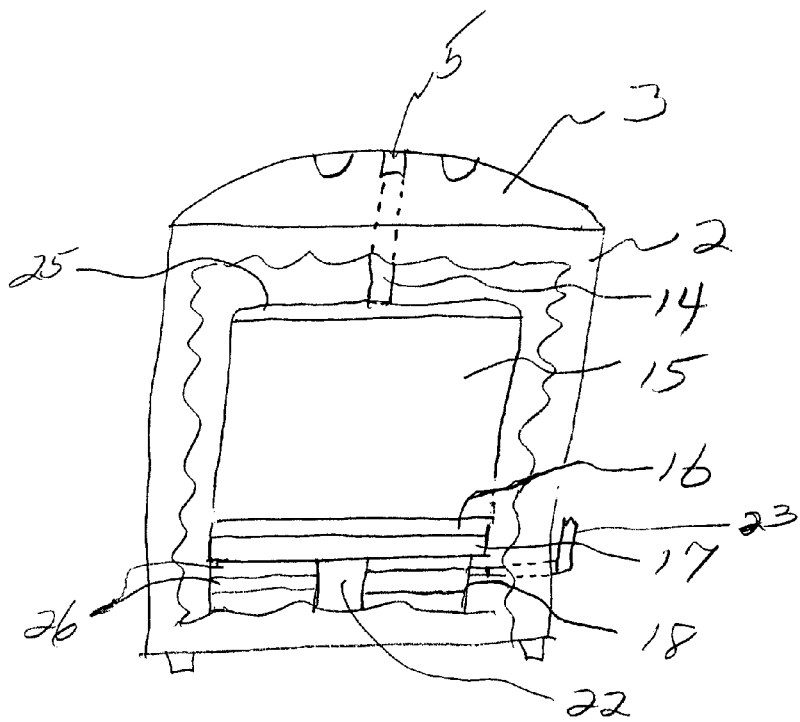
FIG. 4 is a cut-away side view of the present invention.
Figure 5:
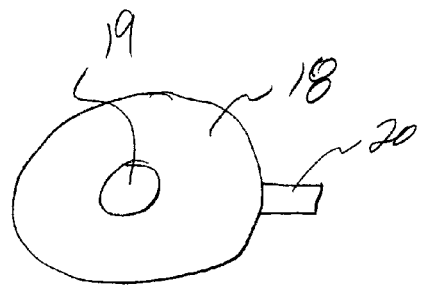
FIG. 5 is a top view of the expandable donut used with the present invention.

As shown in FIGS. 4 and 5, the container 2 has a bag 15 positioned inside. The bag 15 has an outlet 14 connected to its top and the outlet 14 leads to the aperture 5 in the lid 3. The outlet 14 should be sealed to the top of the bag 15 and to the aperture 5 so icing can pass from the bag 15, through the aperture 5 to the hose 7 without leaking. The top 25 of the container bag 15 is made from heavy rubber so the outlet does not fold over. The rest of the bag is made from a material that is collapsible. The portion 16 is a conventional zipper seal so the bag can be filled and sealed. A support shaft 22 (collapsible over lapping not in line) is affixed to the bottom of the container 2. A donut shaped airbag 18 with accordion like folds 26 and with an aperture 19 is positioned around the shaft 22. The bag 18 is connected to the air hose 23.

In order to use the present invention 1, a user would place icing into the icing bag 15 and insert the bag 15 into the container 2. Then tube 14 would be connected through the aperture 5 into the bag. The tip would be placed on the gun. The strap(s) 8 will be placed onto the user's arms to keep the hose away from the cake, or whatever pastry, is being iced. The motor 11 is turned on by means of the switch 21 and the icing device is ready to be used. The motor will pass air into the donut 18 and then through hose 23. The air will expand the donut 18 against the heavy-duty pressure plate 17 which has a rubber edge, and which in turn will press against the bottom of the bag 15. Pressure against the bag 15 will force icing through tube 14 and into the hose 7. The collapsible shaft 22 will hold the donut 18 in place and upright as it expands and contracts, and the donut shape will apply even pressure against the bottom of the bag 15 to extract the icing from the bag.

Figure 6:
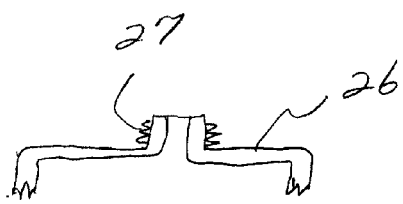
FIG. 6 is a side view of an adaptor used with the present invention.
Figure 4:
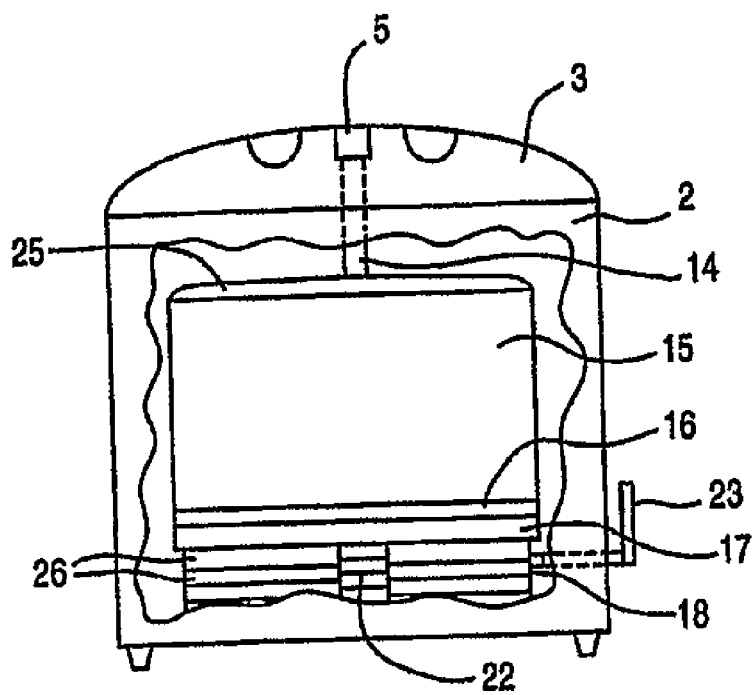
Figure 5:
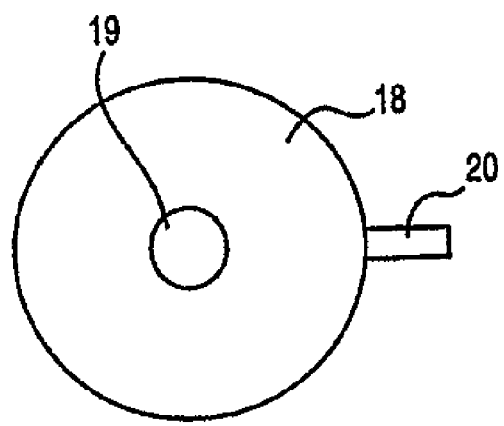
Figure 6:
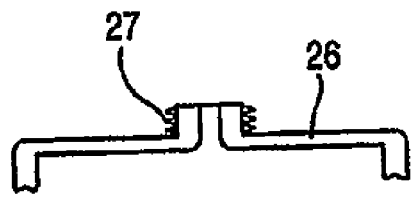

FIG. 6 shows an adaptor 26 which will fit into the container 2 and allow the invention to operate without a bag 15. The adaptor will fit into the top of the container and will have a screw threaded spout 27 which will connect to the hose 7.

Although the Easy Icer and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A pastry accessory for icing pastries, said pastry accessory comprising:
   a container,
   said container having a closed bottom, sides and an open top,
   a lid for closing said open top of said container,
   said lid having an aperture extending therethrough,
   a bag means for holding icing positioned within said container,
   said bag means having a tube connected through said lid, and
   means for collapsing said bag means, and
   wherein said means for collapsing said bag means comprises a motor attached to a side of said container, and
   said motor has means for introducing air into said container, and
   wherein said air bag is circular and has an aperture positioned approximately in a center of said air bag, and
   wherein said container has a shaft positioned on said closed bottom, and
   said aperture in said air bag surrounds said shaft.

2. The pastry accessory for icing pastries as claimed in claim 1, wherein said pastry accessory also has a second tube connected to said bag means,
   said second tube connected to said bag means at one end, and
   said second tube has a tip means for dispensing icing at a second end.

3. The pastry accessory for icing pastries as claimed in claim 2, wherein said second tube has means for attaching said second tube to a user's arm, and
   said means for attaching is positioned along a length of said second tube.

4. The pastry accessory for icing pastries as claimed in claim 1, wherein said means for collapsing said bag means additionally comprises an air bag mounted on said closed bottom of said container, and
   a tube connecting said motor and said air bag.

5. The pastry accessory for icing pastries as claimed in claim 1, wherein said motor is detachable from said container.

6. The pastry accessory for icing pastries as claimed in claim 1, wherein said container has a shaft positioned on said closed bottom, and
   said aperture in said air bag is positioned on said shaft.

7. The pastry accessory for icing pastries as claimed in claim 1, wherein said lid has a recessed handle.

8. The pastry accessory for icing pastries as claimed in claim 1, wherein said means for collapsing said bag means comprises a motor attached to a side of said container, and
   said motor has means for introducing air into said container, and
   wherein said means for collapsing said bag means additionally comprises an air bag mounted on said closed bottom of said container, and
   a tube connecting said motor and said air bag, and
   wherein said motor is detachable from said container.

9. The pastry accessory for icing pastries as claimed in claim 8, wherein said air bag is at least partially corrugated.

10. The pastry accessory for icing pastries as claimed in claim 8, wherein said air bag is circular and has an aperture positioned approximately in a center of said air bag.

11. The pastry accessory for icing pastries as claimed in claim 10, wherein said container has a shaft positioned on said closed bottom, and
    said aperture in said air bag is positioned on said shaft.

12. The pastry accessory for icing pastries as claimed in claim 8, wherein said lid has a recessed handle.

13. The pastry accessory for icing pastries as claimed in claim 11, wherein said shaft is collapsible.

14. A pastry accessory for icing pastries, said pastry accessory comprising:
    a container,
    said container having a closed bottom, sides and an open top,
    a lid for closing said open top of said container,
    said lid having an aperture extending therethrough,
    a bag means for holding icing positioned within said container,
    said bag means having a tube connected through said lid, and
    means for collapsing said bag means, and
    wherein said air bag is circular and has an aperture positioned approximately in a center of said air bag, and
    wherein said container has a shaft positioned on said closed bottom, and
    said aperture in said air bag is positioned on said shaft, and
    wherein said shaft is collapsible.

15. The pastry accessory for icing pastries as claimed in claim 14, wherein said pastry accessory also has a second tube connected to said bag means,
    said second tube connected to said bag means at one end, and
    said second tube has a tip means for dispensing icing at a second end.

16. The pastry accessory for icing pastries as claimed in claim 15, wherein said second tube has means for attaching said second tube to a user's arm, and
    said means for attaching is positioned along a length of said second tube.

17. The pastry accessory for icing pastries as claimed in claim 14, wherein said means for collapsing said bag means additionally comprises an air bag mounted on said closed bottom of said container, and
    a tube connecting said motor and said air bag.

18. The pastry accessory for icing pastries as claimed in claim 14, wherein said air bag is circular and has an aperture extending through said air bag.

19. The pastry accessory for icing pastries as claimed in claim 14, wherein said means for collapsing said bag means comprises a motor attached to a side of said container, and
    said motor has means for introducing air into said container, and
    wherein said means for collapsing said bag means additionally comprises an air bag mounted on said closed bottom of said container, and
    a tube connecting said motor and said air bag, and
    wherein said motor is detachable from said container.

20. The pastry accessory for icing pastries as claimed in claim 19, wherein said air bag is at least partially corrugated.

* * * * *

UNITED STATES PATENT AND TRADEMARK OFFICE
CERTIFICATE OF CORRECTION

| | | |
|---|---|---|
| PATENT NO. | : 6,981,620 B1 | |
| APPLICATION NO. | : 10/839152 | |
| DATED | : January 3, 2006 | |
| INVENTOR(S) | : Vicki J. Buffin | |

It is certified that error appears in the above-identified patent and that said Letters Patent is hereby corrected as shown below:

In the drawings, sheets 1 and 2 should be deleted to be substituted with the attached sheets 1 and 2.

Signed and Sealed this

First Day of May, 2007

JON W. DUDAS
*Director of the United States Patent and Trademark Office*

Figure 3:
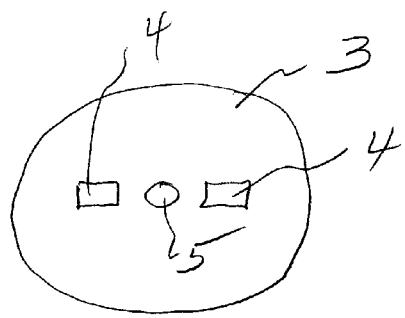
FIG. 3 is a top view of the lid of the present invention.

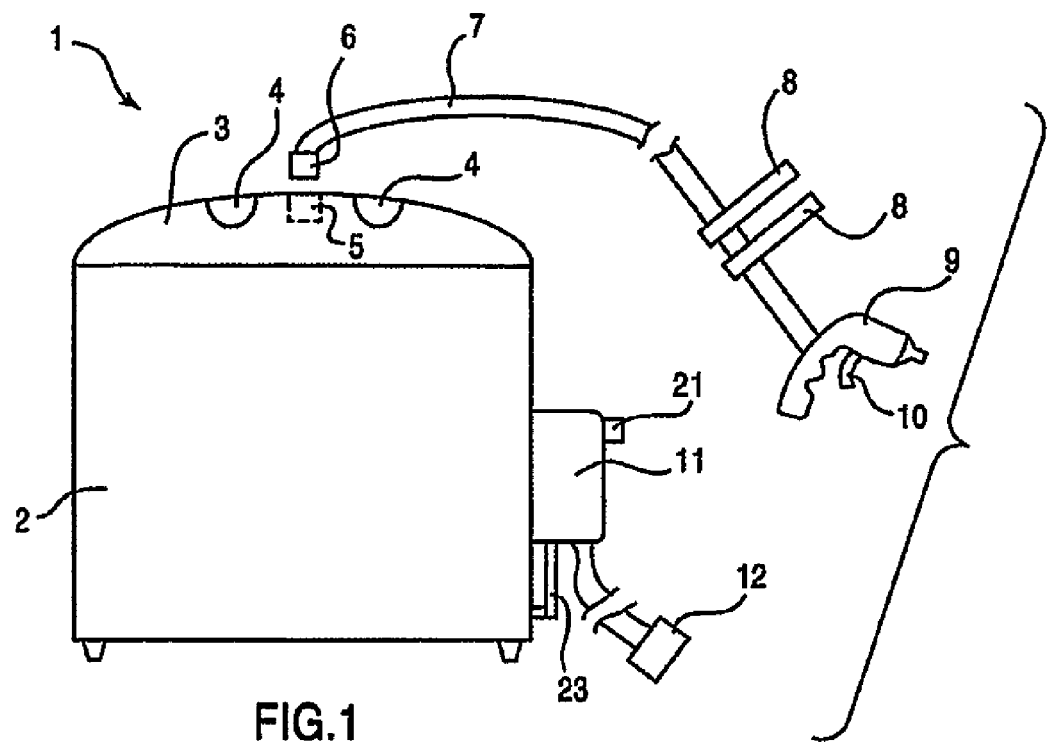
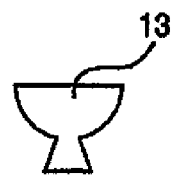
FIG.1
FIG.2
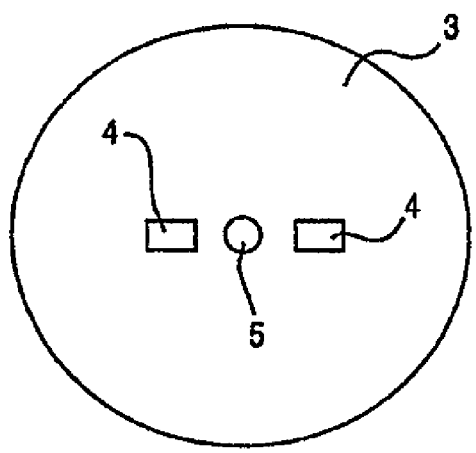
FIG.3